United States Patent

[11] 3,565,994

| [72] | Inventor | Harold S. Jackson<br>Troy, N.Y. |
|---|---|---|
| [21] | Appl. No. | 854,361 |
| [22] | Filed | Aug. 27, 1969 |
| [45] | Patented | Feb. 23, 1971 |
| [73] | Assignee | Allegheny Ludlum Steel Corporation<br>Pittsburgh, Pa. |

[54] ELECTRODE SLAG MELTING METHOD
7 Claims, 2 Drawing Figs.
[52] U.S. Cl............................................... 13/34
[51] Int. Cl............................................... F27d 11/10
[50] Field of Search.................................. 13/9, 13, 34; 219/73

[56] References Cited
UNITED STATES PATENTS
2,300,355  10/1942  Ellefsen........................ 13/34
2,686,824  8/1954  Evans et al.................... 13/13

*Primary Examiner*—Bernard A. Gilheany
*Assistant Examiner*—Roy N. Envall, Jr.
*Attorneys*—Richard A. Speer, Vincent G. Gioia and Howard R. Berkenstock, Jr.

ABSTRACT: The method of melting a consumable electrode in a consumable electrode furnace wherein the end of the electrode being melted is immersed in a slag layer covering the molten metal and ingot being formed by the solidification of the molten metal, and an electrical current is maintained through the electrode and slag to the conductive mold, increasing the rate of melting by periodically moving the electrode in the direction of the axis of the electrode without withdrawing the electrode from the slag layer nor touching the ingot with the electrode.

INVENTOR.
HAROLD S. JACKSON
By Howard R. Berkenstock Jr.
Attorney 3,565,994

ELECTRODE SLAG MELTING METHOD

BACKGROUND OF THE INVENTION

Consumable arc melting furnaces are well known and comprise an electrode of the metal to be melted that extends downwardly into a mold or crucible which receives the molten metal and wherein an ingot is formed by the solidification of the metal. The electrode may be connected to one terminal of a voltage source and means are provided for electrically connecting the other terminal of the source to the crucible. In the case of multielectrode furnaces the electrode circuit may be closed through the mold or another electrode. Usually in starting the melt a small supply of chips or a molten charge is placed in the mold so that when the current is established it is not struck directly to the mold. The electric current is then maintained between the electrode to be melted and the molten pool of metal beneath it, the end of the electrode being melted due to the heat of the passage of current therethrough. As the electrode is melted it is deposited in the mold and forms the aforementioned molten pool, the bottom portion of which continuously solidifies to form an ingot which increases in length from the bottom upwardly. By this process, impurities float to and on the top of the molten pool, and assuming that the pool does not solidity too quickly during the formation of the ingot, the major portion of the impurities will be excluded from the main body thereof. In electroslag melting, a molten slag layer is established on top of the molten pool of metal which is forming into the ingot. This slag layer is conventionally established by placing slag material in the crucible in granular or molten form to provide a conductor to which the current is struck.

As with conventional arc melting, in electroslag melting the distance between the bottom of the electrode and the molten pool is controlled maintaining a more or less fixed distance there between, the theory being that with a fixed distance between the electrode and the molten pool, the melting procedure will be uniform producing the desired characteristics in the resulting ingot. In electroslag melting the electrical current is passed from the electrode through the slag layer substantially through the molten pool of metal. I have discovered tat the rate of melting of the electrode may be increased over that previously experienced by periodically moving the electrode along its axis with respect to the molten pool of metal.

SUMMARY OF THE INVENTION

In a consumable electrode furnace, a method of melting the electrode by lowering the electrode into the conductive crucible establishing an electrical current in the electrode, forming a molten pool of metal thereunder, establishing a molten slag layer on the molten pool of metal, flowing the electrical current substantially through the electrode and slag, and repeatedly moving the electrode by raising and lowering it within the slag layer.

DESCRIPTION OF THE PREFERRED EMBODIMENT

Figures 1, 2:
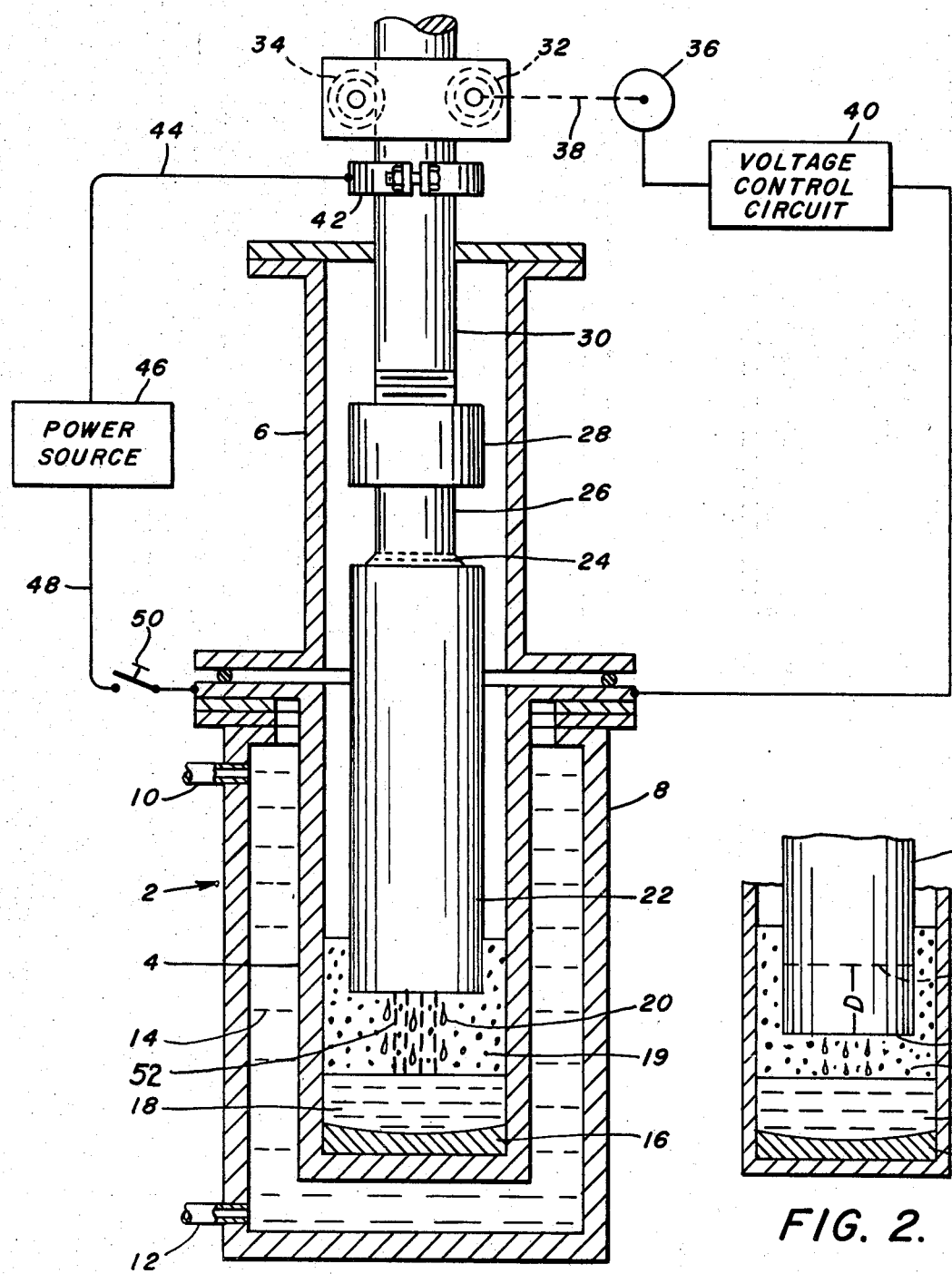
FIG. 1 is a section view of a consumable electrode furnace within which my invention may be practiced.
FIG. 2 is a partial view of the furnace of FIG. 1 with the electrode positioned according to one embodiment of my invention.

Referring now to the drawings, reference numeral 2 indicates a consumable electrode furnace having a single electrode and a mold or crucible 4 which for example may be copper. As is well known in the art, the furnace 2 may also accommodate a plurality of electrodes. Housing 6 may cover the open end of the crucible and be electrically is insulated therefrom. Conventionally surrounding the mold 4 is a water jacket 8 secured thereto by means conventionally known and not shown. Water jacket 8 has inlet ports 10 and outlet ports 12 connected thereto for circulation of the water 14 within the jacket 8.

Mold 4 contains ingot 16 which solidifies from a molten pool 18 maintained by droplets 20 exiting electrode 22 of the metal to be melted. Electrode 22 is welded as at 24 to a stub shaft 26 which in turn, is secured by means of an electrode clamp 28 to the lower end of a vertically reciprocal ram 30. Any type of suitable electrode clamp 28 may be utilized in accordance with the invention; however, one illustrative type is shown in U.S. Pat. No. 3,046,319.

The ram 30 may be reciprocated by one of a number of different known mechanical drives such as hour glass rolls 32 and 34, roll 32 being connected to a drive motor 36 through a linkage 38. Motor 36, in turn, may be controlled by means of a voltage control circuit 40, also well known in the art, wherein ram 30 may be raised or lowered as a function of the voltage existing between the electrode 22 and the mold 4 through the molten slag 19.

On ram 30 is a ram connector 42 to which a conductor 44 is connected leading to a power source 46. A second conductor 48 connects power source 46 to conductive mold 4. Thus, upon the application of power by closing switch 50 a difference of potential is established between electrode 22 and conductive mold 4, and may be closed by a path of electrical current flow through slag layer 19 as indicated at 52. In the case of a multielectrode furnace previously mentioned, the circuit might be closed either through the mold or another electrode.

As was previously mentioned, it is usual practice in the a starting of melting of place a small supply of chips or a charge of molten slag and metal in the bottom of the mold 4. Electrode 22 is then lowered to the charge (not shown) to establish a current flow between electrode 22 and mold 4 through the aforementioned charge.

In the past, it has been common to continue the melting of electrode 22 by positioning it to establish a relatively fixed distance from the molten pool 18. The electrical current passes substantially through the molten slag layer from the electrode 22 to molten pool 18, ingot 16 and out mold 4. As electrode 22 melts to feed pool 18, the electrode is continuously lowered maintaining the desired relative distance between the end of the electrode and the pool. Only a nominal amount of the electrical current is passed directly through mold 4 and not through molten pool 18 and ingot 16. In the past it was also conventional to maintain the relative position of electrode 22 with respect to the top of molten pool 18 relatively constant, allegedly to maintain more uniform melting conditions thus providing an ingot 16 of finer purity.

Contrary to the established practices of electrode slag melting, the invention contemplates periodic movement of the electrode up and down within the molten slag layer 19 as a means of establishing a better heat transfer from the slag 19 to the electrode 22 thereby establishing better melting efficiency by transferring less heat to the water-cooled crucible. The movement also generates a stirring action in the molten slag which helps to keep the slag mixture homogenous and facilitates the migration of the melting droplets of molten electrode into the pool 18 and ingot 16. In the practice of my invention the preferred movement of the electrode up and down is by repeatedly positioning the electrode, as illustrated in FIG. 2, to a low point 56 and then to a high point 58 of a total amplitude D for the electrode movement. The length of the amplitude D of the movement should preferably be approximately three-fourths the depth of the molten slag layer 19. In any case, electrode 22 should be raised no higher in slag layer 19 than that at which a continuing flow of electrical current may be maintained. Further, the electrode should not be lowered so low as to establish a direct current flow to ingot 16 as by contracting molten pool 28. In the preferred practice of my method of electroslag melting, electrode 22 will be raised to a position as illustrated in FIG. 1 whereby the slag layer will present substantially all the resistance to the flow of current, thereby maximizing the amount of heating within the slag layer. After the slag layer 19 has heated to substantially at its highest value, electrode 22 is lowered in molten slag pool 19 to a position where a significant portion of the resistance to the electrical current flow occurs in pool 18 and ingot 16. Though some of the heating by the passage of current through the molten metal layer 18 and ingot 16 is lost through the mold 4 and the cooling water 14, substantial heating of electrode 22 will be gained from the molten slag layer 19 by virtue of the electrode's greater immersion in layer 19. Greater heat into the electrode increases the rate of melting. The actual increased speed of melting will be dependent upon the relative conductivity of the electrode, the slag layer, the molten pool 18 and solidified ingot 16 within the conductive mold 4 as well as the relative diameters of electrode 22, mold 4 and depth of slag layer 19 and positioning of the electrode 22 therein.

It is recognized that the electrode 22 might be oscillated as by a sinusoidal motion rather than being repeatedly positioned within the maximum amplitude of movement. The consistencies of molten slag 19 and molten metal 18 melted thus far have a tendency to slop around in the mold 4 thereby coating mold 4 and electrode 22 with spatterings of slag. I prefer to use periodic positionings of the electrode 22 with respect to the depth of the slag layer 19. A very slow oscillation of the electrode, such as sinusoidal, may be permissible.

As mentioned previously, the movement of the electrode 22 in the molten slag layer 19 facilitates the migration of the molten drops 20 of melted material to the molten pool 18. It is also to be noted that some additional advantages are experienced in reverse polarity DC melting wherein the electrode is maintained positive with respect to mold 4. Therein, removal of the negative oxygen ions out of the impurities and toward the positive electrode is facilitated. It will be apparent to those skilled in the art that other conventional melting currents such as AC and AC superimposed upon DC may be employed in my method.

I claim:

1. A method of melting an electrode in a consumable electrode furnace comprising: establishing a layer of molten slag in said furnace; lowering said electrode into said slag layer; melting said electrode forming a pool of molten metal below said slag layer by flowing an electrical current substantially through said electrode and slag; and repeatedly raising and lowering said electrode in said slag layer during melting.

2. A method according to claim 1 wherein repeatedly raising and lowering said electrode includes periodic positioning of said electrode in said molten slag at predetermined positions relative to said molten metal.

3. A method according to claim 2 wherein raising and lowering said electrode is accomplished in a continually oscillating movement.

4. A method according to claim 1 wherein said electrical current is an alternating current.

5. A method according to claim 1 wherein said electrical current is a continuing direct current.

6. A method according to claim 5 wherein said continuing direct current is of reversed polarity.

7. A method according to claim 4 including biasing said alternating current with a direct current.